(12) United States Patent
Hodge (10) Patent No.: US 11,582,171 B2
(45) Date of Patent: *Feb. 14, 2023

(54) PERSONALIZED CHATBOTS FOR INMATES

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/411,151

(22) Filed: Aug. 25, 2021

(65) Prior Publication Data

US 2022/0045974 A1 Feb. 10, 2022

Related U.S. Application Data

(63) Continuation of application No. 15/174,231, filed on Jun. 6, 2016, now Pat. No. 11,108,708.

(51) Int. Cl.
*H04L 51/02* (2022.01)
*G06F 16/9535* (2019.01)
(Continued)

(52) U.S. Cl.
CPC .......... *H04L 51/02* (2013.01); *G06F 16/9535* (2019.01); *G06Q 50/01* (2013.01);
(Continued)

(58) Field of Classification Search
CPC ..................................................... G06Q 50/01
See application file for complete search history.

(56) References Cited

U.S. PATENT DOCUMENTS 7,805,457 B1 * 9/2010 Viola ................... G06Q 50/26
707/E17.135
7,860,722 B1 * 12/2010 Chow ................. H04M 3/2281
379/88.04

(Continued)

FOREIGN PATENT DOCUMENTS

WO WO 2009/077901 A1 6/2009
WO WO 2010/078614 A1 7/2010

OTHER PUBLICATIONS

International Search Report and Written Opinion directed to International Patent Application No. PCT/US2017/034694, dated Aug. 16, 2017; 13 pages.

(Continued)

*Primary Examiner* — Uzma Alam
(74) *Attorney, Agent, or Firm* — Sterne, Kessler, Goldstein & Fox P.L.L.C.

(57) ABSTRACT

A communication system for providing a positive communication to an inmate is provided. The communication system includes memory that stores data, and an application server that analyzes data to determine topics that are important to the inmate. The application server includes a topic rating system to rate the topics based on importance to the inmate and based on an emotional tone used by the inmate during a communication. When the application server receives a question from the inmate, the application server searches the data and the Internet and responds based on the answer and the data stored in memory. The application server also provides support to the inmate by suggesting counseling services according to the needs of the inmate. Further, the communication system provides a positive influence to the inmate to encourage educational progression.

20 Claims, 7 Drawing Sheets

(51) Int. Cl.
  *H04L 51/04* (2022.01)
  *H04L 67/02* (2022.01)
  *G06Q 50/00* (2012.01)
  *H04L 67/12* (2022.01)
  *H04L 67/50* (2022.01)

(52) U.S. Cl.
  CPC .............. *H04L 51/04* (2013.01); *H04L 67/02* (2013.01); *H04L 67/12* (2013.01); *H04L 67/535* (2022.05)

(56) References Cited

U.S. PATENT DOCUMENTS

| | | | |
|---|---|---|---|
| 8,340,260 B1* | 12/2012 | Rae | H04M 3/38 709/212 |
| 8,996,429 B1* | 3/2015 | Francis, Jr. | G06N 3/008 706/45 |
| 9,386,113 B1* | 7/2016 | Goncharuk | G06Q 10/107 |
| 9,736,428 B1* | 8/2017 | Edwards | H04N 7/152 |
| 9,762,851 B1* | 9/2017 | Baumert | H04N 21/8405 |
| 10,013,980 B2* | 7/2018 | Borsutsky | G10L 15/22 |
| 10,394,900 B1* | 8/2019 | Edwards | G06F 16/951 |
| 10,404,804 B2 | 9/2019 | Hodge | |
| 11,108,708 B2 | 8/2021 | Hodge | |
| 2002/0133347 A1 | 9/2002 | Schoneburg et al. | |
| 2003/0126470 A1* | 7/2003 | Crites | H04L 63/083 379/114.14 |
| 2003/0212546 A1* | 11/2003 | Shaw | G06F 40/30 704/9 |
| 2003/0220972 A1 | 11/2003 | Montet et al. | |
| 2004/0078204 A1 | 4/2004 | Segond et al. | |
| 2006/0206470 A1 | 9/2006 | Tsuzuki et al. | |
| 2006/0206471 A1* | 9/2006 | Tsuzuki | G06F 16/3325 |
| 2007/0233839 A1 | 10/2007 | Gaos | |
| 2008/0183678 A1* | 7/2008 | Weston | G06F 16/335 |
| 2008/0263165 A1 | 10/2008 | Hui et al. | |
| 2008/0281790 A1* | 11/2008 | Prosser | G06Q 30/0269 707/999.102 |
| 2009/0031223 A1* | 1/2009 | Izumi | H04L 51/04 715/758 |
| 2009/0182872 A1 | 7/2009 | Hong | |
| 2009/0193123 A1* | 7/2009 | Mitzlaff | G06F 16/24573 709/227 |
| 2009/0254836 A1 | 10/2009 | Bajrach | |
| 2011/0258148 A1* | 10/2011 | Gao | G06F 16/9535 707/769 |
| 2012/0041903 A1* | 2/2012 | Beilby | G06N 3/004 706/11 |
| 2012/0069131 A1 | 3/2012 | Abelow | |
| 2012/0095835 A1* | 4/2012 | Makar | G06N 20/00 705/14.66 |
| 2012/0101970 A1 | 4/2012 | Zernik et al. | |
| 2012/0183137 A1 | 7/2012 | Laughlin | |
| 2012/0260263 A1* | 10/2012 | Edoja | G06F 16/958 719/313 |
| 2012/0271805 A1* | 10/2012 | Holenstein | G06F 16/955 707/706 |
| 2013/0051548 A1 | 2/2013 | Chavez | |
| 2013/0051584 A1 | 2/2013 | Chavez | |
| 2013/0066750 A1 | 3/2013 | Siddique et al. | |
| 2013/0191898 A1 | 7/2013 | Kraft | |
| 2013/0263227 A1* | 10/2013 | Gongaware | H04L 65/1069 726/4 |
| 2014/0002444 A1 | 1/2014 | Bennett et al. | |
| 2014/0058812 A1 | 2/2014 | Bender et al. | |
| 2014/0156796 A1* | 6/2014 | Hong | G06F 16/24575 709/217 |
| 2014/0250195 A1 | 9/2014 | Capper et al. | |
| 2014/0279050 A1* | 9/2014 | Makar | G06F 16/9535 705/14.66 |
| 2014/0379843 A1* | 12/2014 | Schaefers | G06F 21/10 709/213 |
| 2015/0168150 A1* | 6/2015 | Kahn | G01C 21/3484 701/538 |
| 2015/0206329 A1 | 7/2015 | Devries | |
| 2015/0248649 A1* | 9/2015 | Avats | G06Q 10/1053 705/321 |
| 2015/0310344 A1* | 10/2015 | Gunjan | G06Q 50/01 706/52 |
| 2015/0314454 A1 | 11/2015 | Breazeal et al. | |
| 2015/0324562 A1 | 11/2015 | Scavezze et al. | |
| 2015/0326570 A1 | 11/2015 | Publicover et al. | |
| 2015/0348329 A1 | 12/2015 | Carre et al. | |
| 2016/0071326 A1 | 3/2016 | Spivack | |
| 2016/0140320 A1 | 5/2016 | Moturu et al. | |
| 2016/0156625 A1 | 6/2016 | Hodge et al. | |
| 2016/0162946 A1* | 6/2016 | Delli Santi | G06Q 30/0254 705/14.52 |
| 2016/0180590 A1 | 6/2016 | Kamhi et al. | |
| 2016/0193732 A1* | 7/2016 | Breazeal | G10L 15/22 700/258 |
| 2016/0253428 A1* | 9/2016 | Hasan | G06F 16/9535 707/754 |
| 2016/0373397 A1* | 12/2016 | Kesten | H04L 67/53 |
| 2016/0381416 A1 | 12/2016 | Fan et al. | |
| 2017/0041454 A1 | 2/2017 | Nicolls et al. | |
| 2017/0080346 A1 | 3/2017 | Abbas | |
| 2017/0083714 A1 | 3/2017 | Keiser et al. | |
| 2017/0124573 A1* | 5/2017 | Hall | H04L 67/306 |
| 2017/0139916 A1* | 5/2017 | Cama | G06F 16/9535 |
| 2017/0236407 A1* | 8/2017 | Rhoads | H04L 67/34 455/420 |
| 2017/0353404 A1 | 12/2017 | Hodge | |
| 2018/0219950 A1 | 8/2018 | Hodge | |
| 2018/0240275 A1 | 8/2018 | Clements et al. | |
| 2018/0276895 A1 | 9/2018 | Hodge | |
| 2019/0143527 A1* | 5/2019 | Favis | B25J 11/0015 700/264 |
| 2019/0394282 A1 | 12/2019 | Hodge | |
| 2022/0148726 A1* | 5/2022 | Costantino | G06K 7/1417 |

OTHER PUBLICATIONS

International Search Report and Written Opinion directed to International Patent Application No. PCT/US2018/015989, dated Apr. 12, 2018; 18 pages.

European Search Report directed to related European Patent Application No. 17810718, dated Dec. 9, 2019; 8 pages.

International Search Report and Written Opinion directed to International Patent Application No. PCT/US2018/024616, dated Jun. 14, 2018; 17 pages.

\* cited by examiner

PERSONALIZED CHATBOTS FOR INMATES

CROSS-REFERENCE TO RELATED APPLICATIONS

This application is a continuation of U.S. patent application Ser. No. 15/174,231, filed on Jun. 6, 2016, which is incorporated by reference herein in its entirety.

BACKGROUND

Field

The disclosure relates to a communication system that facilitates communications between an inmate at a correctional facility and a chatbot.

Background

Correctional facilities provide inmates with the ability to communicate with friends, families, and visitors as it improves recidivism and provides incentives for inmates to follow rules and policies of the facility. In addition to traditional telephone calls and telephone visitations, correctional facilities seek to offer a wide variety of communication services to inmates, such as video visitation and video calls, among others. While in correctional facilities, some inmates lose contact with friends and families due to change of contact information of friends and families, due to death of friends and family members, or due simply to the inmate's confinement. Accordingly, other means of improving recidivism are necessary.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

In correctional facilities, inmates are usually surrounded by negative influences which encourage inmates to break rules of the correctional facility and to violating laws when released. In some cases, inmates encourage other inmates to join certain groups as lifetime members by indicating that the group is the only family the inmates will have. These negative influences can have serious harmful effects on the ability of the inmate to successfully rejoin society.

Traditionally, inmates received positive influences from family and friends that want the inmate to be released and not to return to a life of crime. However, over time, inmates lose contact with friends and family. In some instances, friends or family move, contact information is lost, or friends or family die. In other instances, inmates are in solitary confinement and lose access to typical communal communication devices to talk to family and friends. As devices, such as smart devices, have become more prevalent inside of correctional facilities, the ability to communicate with someone becomes more available, despite the loss of contact with friends and family members.

In light of the above, the present disclosure provides a system and method for inmates to communicate with a personalized chatbot to facilitating communication with what the inmate may perceive as a friend or family member. The personalized chatbot provides a way for the inmate to learn from mistakes and receive a positive influence despite the inmate's circumstances. The chatbot further provides educational support to an inmate such that the inmate can learn proper grammar and vocabulary or learn occupational and vocational skills. Communications with the chatbot can include real-time and non-real time communications such that the chatbot is perceived as more human-like. Further, these communications can be by way of a communication device that includes a graphical user interface (GUI) that displays an image or animation meant to represent the chatbot in a human form, a text application, or an email application. Communications with a chatbot can also be performed by way of traditional communication devices such as a telephone.

Communication System

Figure 1:
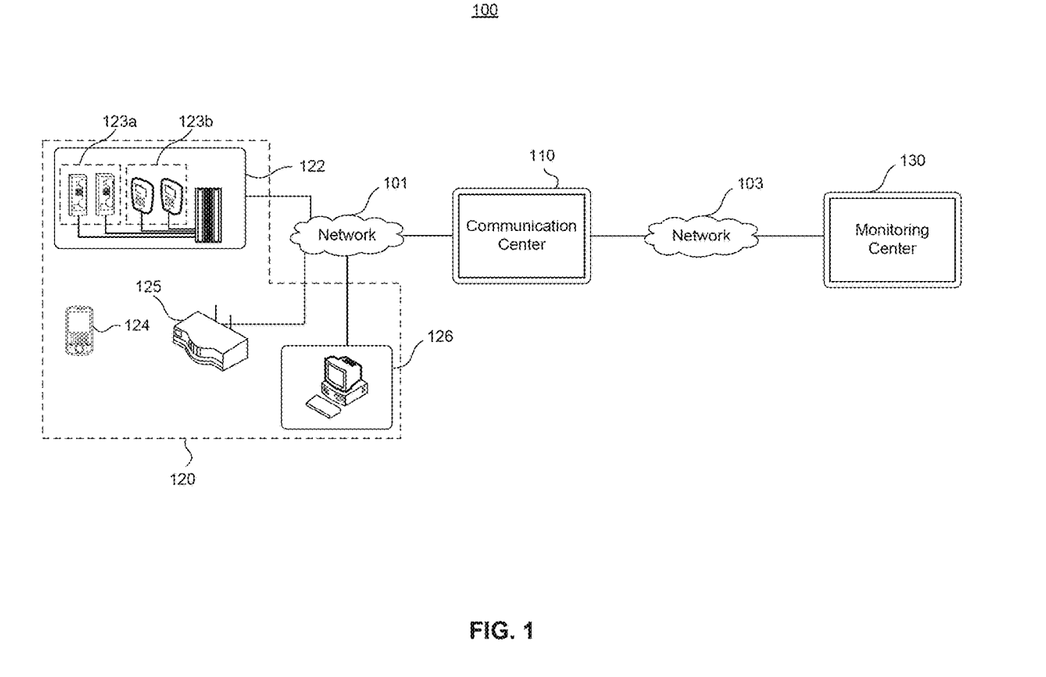
FIG. 1 illustrates a block diagram of a communication system, according to exemplary embodiments of the present disclosure.

FIG. 1 illustrates a block diagram of a communication system 100, according to exemplary embodiments of the present disclosure. The communication system 100 includes a communication center 110 configured to receive and transmit communications to/from a communication device 120 and to/from a monitoring center 130.

The communication device 120 includes any or all communication devices located at a correctional facility. The communication device 120 includes such devices as wired communication devices 122, which include audio communication devices 123a and video communications devices 123b, wireless communication device 125, and/or a work station 126. The communication center 120 also connects to a wireless access point 125 (e.g., a router), which can provide connectivity to the wireless devices 124. The communication device 120, such as the video communications devices 123b, the wireless communication device 125, and/ or the work station 126, can be configured to include a camera and a screen for generating and viewing videos or images. The communication device 120 connects to the communication center 110 via a network 101. The network 101 includes a Local-Area Network (LAN), a Wide-Area Network (WAN), or the Internet, depending on the location of the communication center 110 in relation to the communication device 120. For example, the communication center 110 may be located at a correctional facility where the communication device 120 is located and therefore a LAN is used. In another example, the communication center 110 is located at a different location than the correctional facility and therefore the network 101 is a WAN or the Internet.

The monitoring center 130 facilitates the monitoring of communications from the communication device 120. The monitoring center 130 facilitates monitoring and review of communications automatically or manually by a reviewer. The monitoring center 130 is configured to receive communications and data from the communication center 110. The monitoring center 130 is configured to connect to the communication center 110 via a network 103. The network 103 includes a LAN, a WAN, or the Internet, depending on the location of the communication center 110 in relation to the monitoring center 130. In an embodiment, the monitoring center 130 is further configured to communicate with the communication center 110 to indicate approval to start, pause, continue, or end communications. In an embodiment, based on a review of communication, the inmate may be suspended from using a chatbot for a predetermined amount of time or indefinitely. Suspension can occur by discussing or organizing a crime or using the chatbot improperly for such actions as circumventing security platforms. In yet another embodiment, some communications are not monitored by the monitoring center 130. In this case, the communication center 110 can store a communication, as will be described in more detail below, but does not transmit the communication to the monitoring center 130. By making the communication confidential, the chatbot appears more personal, and a trusting relationship can be established between the inmate and the chatbot. Whether a communication is transmitted to the monitoring center 130 may be based on such factors as regulations of the correctional facility and jurisdiction, the inmate and/or the inmate's reason for incarceration, or the size of the communication file.

Communication Center

Figure 2:
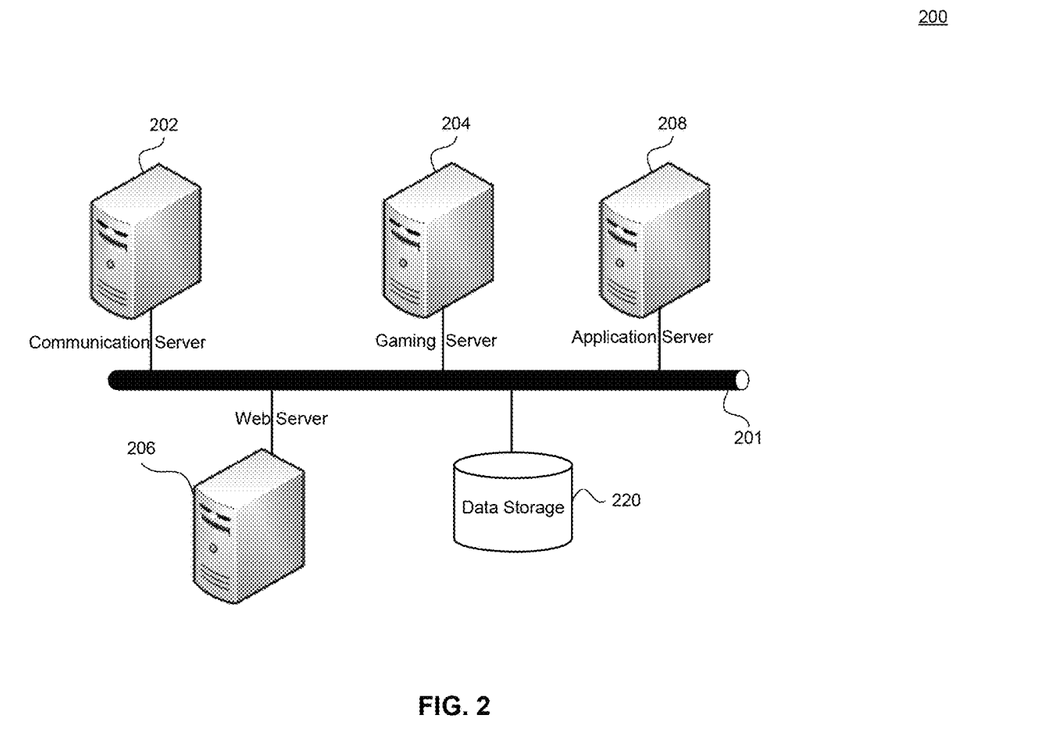
FIG. 2 illustrates a block diagram of a communication center, according to exemplary embodiments of the present disclosure.

FIG. 2 illustrates a block diagram of a communication center 200, according to exemplary embodiments of the present disclosure. The communication center 200 represents an exemplary embodiment of the communication center 110 of FIG. 1. The communication center 200 includes a communication server 202, a gaming server 204, a web server 206, an application server 208, and data storage 220, that are all connected to each other via a network bus 201.

Each of the servers 202-208 can be constructed as individual physical hardware devices, or as virtual servers. The number of physical hardware machines can be scaled to match the number of simultaneous user connections desired to be supported in the communication system 100.

The communication server 202 consists of any number of servers, and is configured to route communications and data to/from the communication device 120 and to/from the monitoring center 130. In doing so, the communication server 202 performs switching required to electrically transmit/receive communications to the communication device 120 and/or the monitoring device 130. Further, the communication server 202 is also configured to store communications and data and/or transfer the communication to another server. The communication server 202 stores the communications and data as files on an internal storage or an external storage, as will be explained in more detail below.

Because there may be a variety of different communication standards employed by different audio, video, image, and text devices used to communicate with the communication center 110, in an embodiment, the communication server 202 may also perform format conversion of the communications and data. The conversion my convert incoming communications as needed, or may convert outgoing communications to be compatible with the communication device 120 or the monitoring center 130. For example, a communication from the video communication device 123b can be received in a first format, such as an MPEG-4, and transmitted to the monitoring center 130 in a second format, such as flash video format. In an embodiment, the audio and video communications are converted to and stored as text logs. The communication server 202 is configured to perform a preliminary keyword search of the text logs and determine whether the monitoring center should be alerted to improper use of a chatbot by an inmate. Further, the communication server 202 is configured to store audio or video communications along with corresponding text logs for a predetermined amount of time to be used to solve technical issues such as whether the chatbot is properly recognizing speech or communications properly.

Further, because the communication server 202 receives and transmits communications and data by way of a network, in an exemplary embodiment, the communication server 202 can encrypt and decrypt communications and data, for security purposes.

In an embodiment, the inmate can play games with the chatbot to provide companionship. Accordingly, the communication center 110 includes the gaming server 204. The gaming server 204 consists of any number of servers, and is configured to facilitate the hosting of games for the inmate and chatbot to play. The gaming server 204 is configured to host games such that an inmate can play a game with a chatbot, a chatbot can play a game with another chatbot, and/or an inmate and chatbot can play with other inmates and chatbots. In many instances, the available games are custom made for the chatbot, some with the objective of teamwork with the chatbot and other with the objective of friendly competition with the chatbot. Regardless of whether the games are custom-made for the chatbot or are localized versions of publicly-available games, all games are pre-screened by the correctional facility before being hosted by the gaming server 204. The games hosted by the gaming server 204 include educational games to help an inmate on grammar, math, or other topics, video versions of board games, or action games, to provide some examples. In an embodiment, the inmate purchases a game or access to a game by way of an inmate's account, which is set up during registration, as will be described in further detail below.

The gaming server 204 is also configured to include virtual and non-virtual shopping centers. The virtual shopping center allows an inmate to purchase virtual gifts for a chatbot, or other in-game items. Purchases can include virtual clothing, accessories, gifts, or other virtual items that are different from basic virtual items that an inmate selects during the time of registering and setting up a chatbot, as is described below. The non-virtual shopping center allows an inmate to purchase items such as music, that can be played on the communication device 120, and/or items available to the inmate through the correctional facility. These include items available through a commissary at the correctional facility, such as food or hygiene products.

The web server 206 consists of any number of servers, and is configured to run web server software such as Apache, Microsoft Internet Information Server, and/or an interactive voice response (IVR) server software. The primary function of the web server 206 is to route requests and other communications from communication device 120 to an appropriate destination within the communication system 100. In an embodiment, the web server 206 can also serve as a maintenance point into the communication center 200, by which servicing, configuring, and updating can be performed. In an embodiment, the web server 206 is connected to both the public Internet and the internal network of a correctional facility. In an embodiment, the web server 206 can provide managing services for generating communications and receiving instructions from an inmate to send or receive communications. For example, the web server 206 can facilitate an inmate in generating a communication when the inmate uses a front-end application having a user interface. The application server 208 consists of any number of servers, and is configured to function as the primary logic processing center in the communication system 100. In general, the application server 208 is the chatbot. The application server 208 is configured to perform natural communication processing for communications with an inmate. The natural communication processing allows a chatbot to communicate with the inmate in a more natural audio or text that imitates human behavior as compared to a keyword search, where a chatbot responds to a conversation based on certain keywords in a communication from the inmate.

The application server 208 is configured to analyze stored data from the data storage 220 to generate more personalized communications for the inmate. Analyzing the data includes the application server 208 connecting to the data storage 220 and extracting topics or issues that are determined to be important to the inmate. This can be performed based on keyword repetition detection, emotional speech analysis, or other analyses tools. By extracting these topics, the chatbot can be informed of topics that are deemed "important" or at least "of interest" to the inmate. Thus, the application server 208 can tailor communications to the inmate's interests. In an embodiment, the application server 208 includes a topic rating system to rate those topics deemed to be important with a high rating and less important topics with a low rating. By performing emotional analysis during the topic extraction, the application server 208 can also flag certain topics as making the inmate happy, versus flagging others that make the inmate angry, sad, or otherwise. Thus, the chatbot can adjust its tone and discussion approach with the inmate accordingly in order to better connect with the inmate. For example, for a "happy topic", the chatbot can ask questions and provide responses with a tone of excitement, whereas for sad or angry topics, the chatbot can strike a conciliatory or solemn tone. In these manners, the chatbot is able to show a level of understanding to the inmate that will allow the inmate to deepen his personal relationship with, and trust in, the chatbot. The topic rating system provides a quick way for the application server 208 to categorize and process the stored data to generate a communication. The application server 208 is also configured to update the stored data and the topic ratings based on communications with the inmate and or updated data in the data storage 220.

Further, when a communication is received from an inmate, the application server 208 is configured to analyze the communication to determine an intent of the communication. The intent includes parsing the communication into terms and categories. Based on the parsing, the application server 204 determines a most likely subject matter and purpose for the communication. Further, the parsing also allows the application server 208 to determine whether the communication is a question. Based on the intent of the communication, the application server 208 determines a response to the application in view of analyzed stored data, as is described below.

In an embodiment, the application server 208 is further configured to evaluate an educational level of an inmate and help improve the education level. To evaluate the educational level of the inmate, the application server 208 analyzes stored data from the data storage 220 to determine patterns of grammar, vocabulary, and/or mathematics where the inmate can improve. Patterns include repeated misspelling of words, misplacement of punctuation, or incorrect answers to mathematical questions. Based on the analysis, the application server generates communications with communications that provide correct grammar, vocabulary, or mathematical responses or encourages the inmate to participate in games that can promote an increase in educational learning.

In an embodiment, the application server 208 includes a plurality of timers. The plurality of timers includes a communication timer to determine when the chatbot initiates a communication with the inmate. The communication timer can function based on a specific schedule, for example, at a particular time each day if no other conversation has occurred, or the communication timer can function based on a randomized algorithm to give an appearance of a more human like conversation. The algorithm can factor in such aspects as a personality of the inmate, a schedule of the inmate, time and location of the inmate, or rules and regulations of the correctional facilities. As an example, at the time of creating a chatbot, the inmate can take a personality traits test to determine a compatible chatbot, and the results of the test are used by the algorithm to determine when the chatbot will initiate a conversation. In an embodiment, the plurality of timers also includes an identity timer to determine when to perform an identity verification, as is described in more detail below. The identity timer can be set to perform an identity verification at predetermined times or at randomized times during a string of communications.

Figure 3:
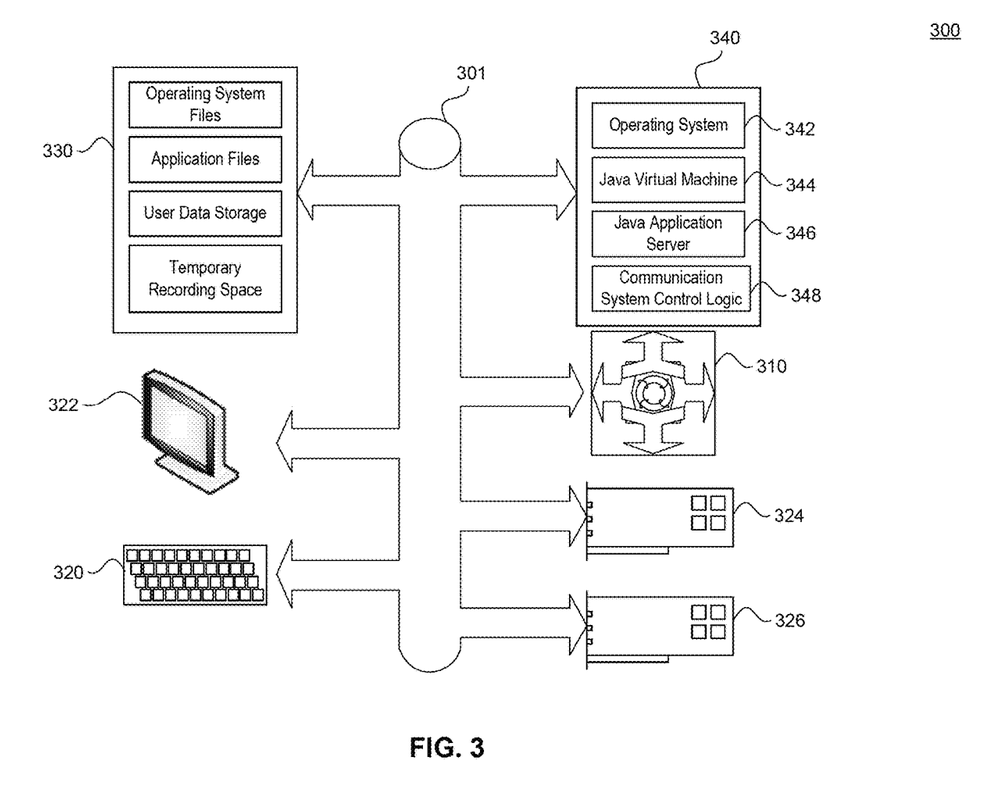
FIG. 3 illustrates an application server, according to exemplary embodiments of the present disclosure.

FIG. 3 illustrates an application server 300, according to exemplary embodiments of the present disclosure. The application server 300 may represent an exemplary embodiment of the application server 208 depicted in FIG. 2. The application server 300 includes one or more central processing units (CPU) 310 connected via a bus 301 to several other peripherals. Such peripherals include an input device, such as a keyboard and/or mouse 320, a monitor 322 for displaying information, a network interface card 324 and/or a modem 326 that provide network connectivity and communication.

The application server 300 also includes internal data storage 330. This data storage 330 is non-volatile storage, such as one or more magnetic hard disk drives (HDDs) and/or one or more solid state drives (SSDs). The data storage 330 is used to store a variety of important files, documents, or other digital information, such as the operating system files, application files, user data, and/or temporary recording space.

The application server 300 also includes system memory 340. The system memory 340 is preferably faster and more efficient than the data storage 330, and is configured as random access memory (RAM) in an embodiment. The system memory 340 contains the runtime environment of the application server, storing temporary data for any of the operating system 342, java virtual machine 344, java application server 346, and communication control logic 348.

Figure 4:
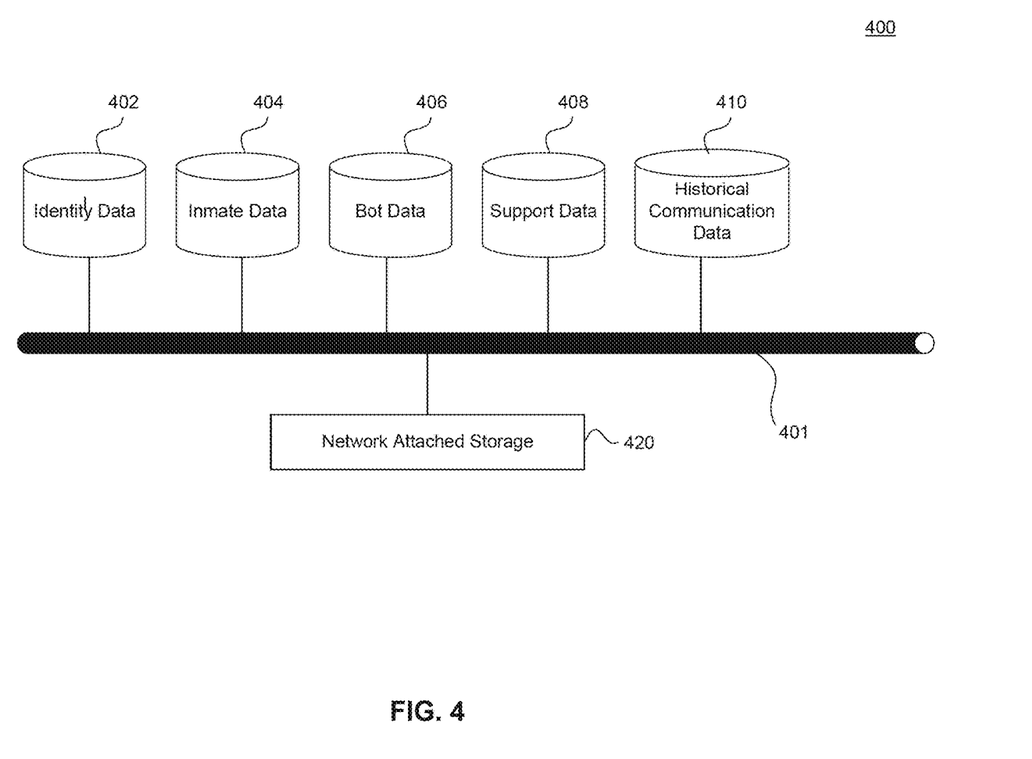
FIG. 4 illustrates a block diagram of storage devices, according to exemplary embodiments of the present disclosure.

FIG. 4 illustrates a block diagram of storage devices 400, according to exemplary embodiments of the present disclosure. As shown in FIG. 4, in addition to internal storage each of the servers 202-208, one or more databases and associated Network Attached Storage devices are connected to the application server 300 via the network 401. For purposes of this disclosure, the term database should be understood to encompass a relational database application or a remotely defined data sore in addition to a traditional relation database. application As illustrated by FIG. 4, the stored devices 400 provide access to a wide variety of data. The identity data 402 includes information on identity of inmates using the communication system 100 for the purpose of security. Identity data includes information regarding at least one of a username and a password, a biometric sample of an inmate such as an audio sample, a fingerprint, a facial sample (2D or 3D), or a retinal sample, a device identification such as make and model of a communication device 120 assigned to or typically used by an inmate, or a location of an inmate. The identity data 402 includes data directly entered by the inmate, the correctional facility, and/or obtained from a Jail Management System.

The inmate data 404 stores information regarding the inmate. The information includes an inmate's background history, schedule, and personal information. The background history information includes a reason for an inmate's incarceration, prior locations that an inmate has lived, known friends and family. The schedule includes activities, jobs, or hobbies that the inmate has while incarcerated. The personal information includes web browser information, books checked out from the library, and/or identities of those with whom the inmate has recently communicated with. In an embodiment, an inmate selects what information is stored by way of selecting what information can be available. The inmate data 404 includes data entered by an inmate, obtained from a Jail Management System, and/or updated by the application server 208.

The bot data 406 is information related to the chatbot including appearance, voice, and personality. The appearance data includes sex, race, size and shape of a chatbot. The voice data includes such aspects as language or dialect of a chatbot. The personality data includes settings to select a general personality type of a chatbot and frequency of communications. The bot data 406 includes data directly entered by an inmate.

The support data 408 includes data that is used as support for an inmate's questions or needs. The support data is used by the application server 208 to provide suggestions to an inmate depending on a communication. The support data includes information related to services available to the inmate or the inmate's family, an inmate's communication history with outsiders, available correctional facility events, or internet searches based on other support data, to provide some examples. The services available to the inmate or inmate's family can include medical providers, counselors, attorneys, or educational providers. The support data 408 includes data entered by an inmate, obtained from a Jail Management System, and/or updated by the application server 208.

The historical communications data 410 includes data such as communication logs related to past communications between an inmate and a chatbot. In an embodiment, the application server 208 can convert audio or video communications into a file format, such as text file, for faster searching of past communications. In essence, the historical communications are stored by the application server 208 and act as a memory for the chatbot.

User Interface

A user interface such as a website, the IVR, or another interface is managed by, or on behalf of, a correctional facility. The user interface provides an interactive platform for users wanting to transmit and receive communications with a chatbot. Accordingly, the interface's backend links to or communicates with the application server 208 via the web server 206.

In this case, communications with a chatbot, by way of the communication center 110, are via some form of a user interface. The user interface is either an IVR system accessed by way of a microphone and speaker on any of the communication devices 120 or by a graphical interface accessed by way of a front-end application on a communication device 120 having audio and video/image functionality. The IVR system is configured to facilitate an inmate in having an audio communication, by way of the communication device 120, with the chatbot. In doing so, the inmate and chatbot can have a conversation, have communications from others, such as email or text, read, send communications to others, or make purchases all by way of the communication device 120. The graphical interface is configured to facilitate the same functions but also includes visual options to an inmate. Accordingly, a communication device 120 that includes a front-end application for a graphical interface facilitates both audio and visual communications with the chatbot.

Figure 5:
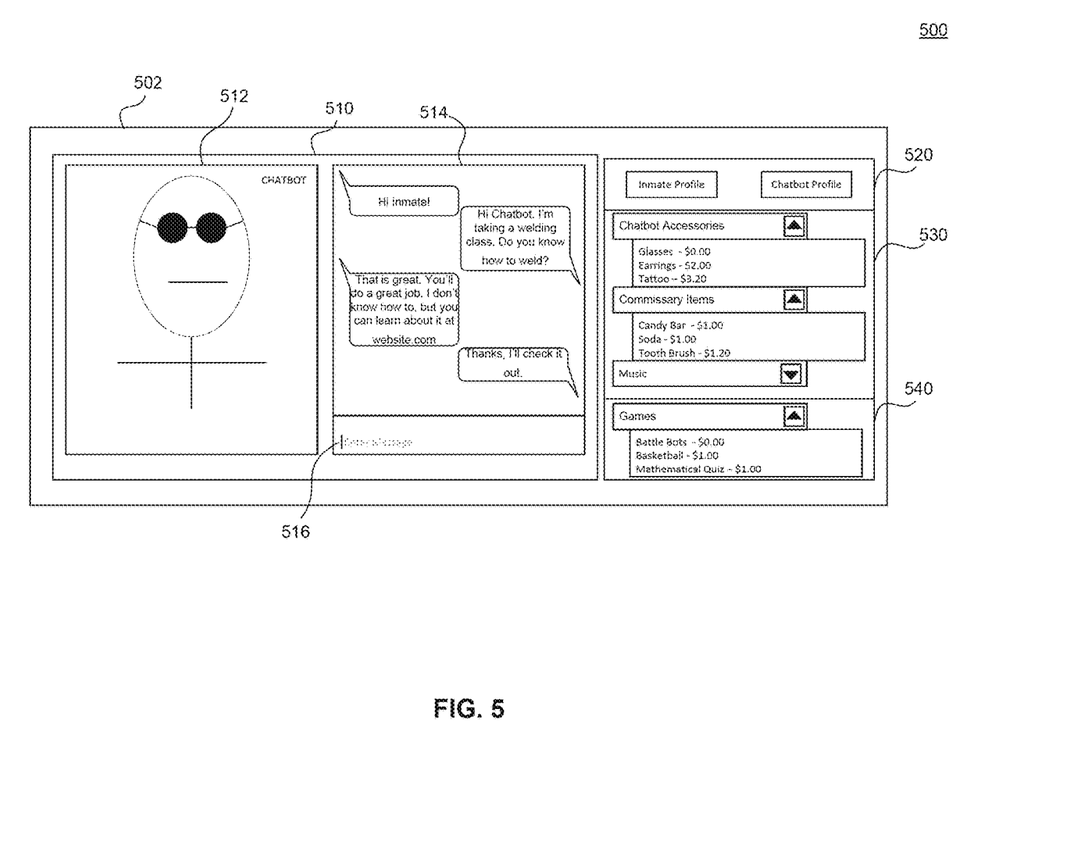
FIG. 5 illustrates a flowchart diagram of a method for generating a non-real time communication, according to exemplary embodiments of the present disclosure.

FIG. 5 illustrates a graphical interface 500 of a communication device 120 having video/image functionality, according to exemplary embodiments of the present disclosure. The graphical interface 500 may represent an exemplary embodiment of a user interface for the communication device 120 of FIG. 1. The graphical interface 500 includes an interface window 502 having different panels to facilitate communication with a chatbot. The interface window 502 includes a communication panel 510 and a settings panel 520.

The communication panel 510 includes an image window 512, including an image or animation of the chatbot, and a messaging window 514 to send or receive text messages. In an embodiment, the communication panel 510 only includes one of the messaging window 514 or the image window 512. An inmate communicates with the chatbot by way of either a microphone/speaker on the communication device 120, and/or by way of a messaging area 516 on the messaging window 514. For example, an inmate can indicate a desire to learn a particular skill and the chatbot can respond by speech that a particular website has useful information on the particular skill and send, by way of the messaging window 514 a link to the particular website.

The settings panel 520 includes settings for an inmate to change regarding the inmate's profile and the chatbot's profile. Inmate profile settings include what type of information the inmate would like the chatbot to have access to and/or how much communication the inmate wants with the chatbot. Chatbot profile settings include personality type, appearance type, language, and/or goals to accomplish for the chatbot. The inmate profile and the chatbot profile settings may be accessed by a button, as shown by FIG. 5.

In an embodiment, the interface window 502 also includes a shopping panel 530 and/or a game panel 540. The shopping panel 530 includes options provided by the gaming server 214 for an inmate to make virtual and non-virtual purchases, as previously discussed. As shown by FIG. 5, the graphical interface 500 includes options to change the appearance of the chatbot including the purchasing of clothes or accessories for the chatbot. Further, the graphical interface 500 includes the option for purchasing non-virtual items such as food, hygiene products, or music. The game panel 540 includes games provided by the gaming server 214 that the inmate and/or the chatbot can play against each other and/or against other inmates and other chatbots.

Registration and Setup

While an example of a user interface has been discussed in regards to a communication with a chatbot, in the following operations, examples of additional website interfaces will be explained. However, as will be understood by those skilled in the arts, in other embodiments the interfaces may be through the IVR which may limit some of the operations below.

An inmate wishing to communicate with a chatbot is required to first register and set up an account with the communication center 100. The registry process requires the user to submit identity data to the communication system 100 in order to verify the user's identity to a high degree of likelihood. The identity data includes at least one of a username and a password data, biometric data such as voice data, facial data, fingerprint data, or facial data (2D or 3D), device data such as make and model of a communication device, or location data. Registration can be either in-person such as at a work station, or online by way of a communication device 120, depending on correction facility rules. This is particularly important for security purposes, to ensure that the communication center 100 can properly verify inmates. As with all authentication procedures described herein, upon a predetermined number of failed attempts to authenticate an identity of an inmate, the inmate will be prohibited from accessing the communication center 110 (at least until the inmate can confirm their identity by some other way such as in-person, over the phone, or online confirmation, to unlock the inmate's account).

In an embodiment, the registration process the inmate also sets up a payment system to pay for in-app purchases such as games or shopping. The payment system requires the inmate to enter information on a form of payment such as direct deposit from the inmate's correctional facility account, commissary account, and/or a gift card. The inmate also has the option of not allowing in-app purchases.

Once registered, the inmate can setup and select a chatbot profile. Setting up a chatbot is performed by a website interface which the inmate accesses through a communication device 120. In doing so, the application server 208, via the web server 206, provides the website interface options on chatbot data such as appearances settings, audio settings, and personality settings of a desired chatbot, for the inmate to select from. In an embodiment, during registration or setup, the inmate participates in a personality test and some of the settings for chatbot data are selected according to the results of the personality test. After the settings for chatbot data have been selected, the application server 208 generates a chatbot for the inmate such as the chatbot illustrated by FIG. 5.

In an embodiment, the inmate selects how to initiate a communication with a chatbot. For example, during the setup the inmate can select from initiating a communication with a chatbot only after the inmate has logged into an application, only during certain hours of the day, or any time of the day allowed by the correctional facility.

Identity Verification

The identity data facilitates a secure communication between the communication center 110 and the communication device 120 by allowing the communication center 110 to verify an identity of a purported inmate. When a purported inmate attempts to access the communication center 110 to have a communication with a chatbot, the application server 208 performs an identity verification by comparing a sampling of data received from the purported inmate with the stored identity data 402. The sampling of data includes a username and a password, a biometric sample of the purported inmate such as an audio sample, a fingerprint, a facial sample (2D or 3D), or a retinal sample, a device identification such as make and model of a communication device 120 used by the purported inmate.

In an embodiment, the application server 208 also performs identity verifications during a video or voice communication such that the application server 208 verifies that a correct inmate is involved in a string of communications. Identity verifications during the video or voice communication are performed by voice and/or facial recognition, which tends to require a significant amount of processing power and time. To reduce an amount of processing required, the application server 208 can perform the verifications based on the identity timer. By way of the identity timer, a sampling of the purported inmate is taken at predetermined times during the communication, or at random times.

Communication with Chatbot

Figure 6:
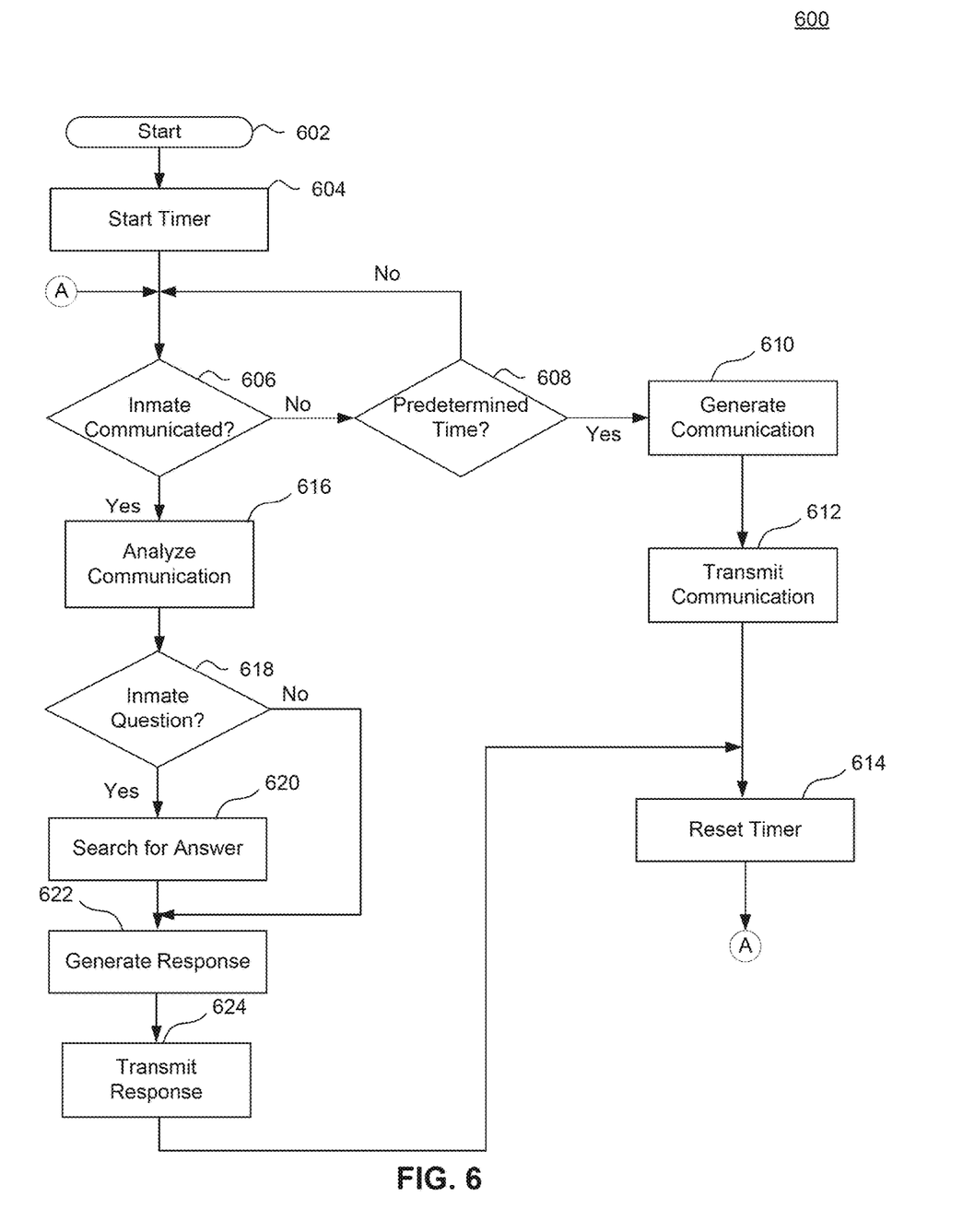
FIG. 6 illustrates a flowchart diagram of a method for transmitting a non-real time communication, according to exemplary embodiments of the present disclosure.

A chatbot communication operation of the communication system 100 will be described with respect to FIG. 6, which illustrates a flowchart diagram of a method 600 for communicating with a chatbot, according to exemplary embodiments of the present disclosure. Although the physical devices and components that form the system have largely already been described, additional details regarding their more nuanced operation will be described below with respect to FIGS. 1-5.

At the outset, a communication operation starts (602). The start of a communication operation can be due to one or more of an inmate logging onto an application, the start of inmate communication time set by the inmate or allowed by a correctional facility. For example, when an inmate opens an application on the wireless communication device 124, the wireless communication device 124 performs an identity verification by capturing a sample of the purported inmate's voice and comparing the sample with the identity data stored by the identity server 204. When the identity of the purported inmate is confirmed, the inmate is logged on to the application, and the communication operation starts. Next, the application server 208 starts the communication timer (604). The application server 208 then determines whether the inmate has communicated through the user interface (606). The communication can be by either voice or text. If no communication has been received from the inmate, then the application server 208 determines whether the communication timer has reached a predetermined time (608). The predetermined time is based on the personality settings of the chatbot saved in the bot data 406. For example, when the personality settings of the chatbot indicate that the chatbot is talkative, the predetermined time is less than half a second. However, when the personality settings for the chatbot indicate that the chatbot is shy, the predetermined time is set at greater than half a second. If the communication timer has not reached the predetermined time, the application server 208 returns to determine whether the inmate has communicated with the chatbot (606).

If the communication timer has reached the predetermined time, the application server 208 analyzes data (610) such as the inmate data 404, the support data 408, and the historical communication data 410 to determine communications topics to discuss with the inmate. The topics are determined based on the topic rating system. Once analyzed, the application server 208 determines how to communicate with the inmate about a topic based on the bot data 406 such as the chatbot personality settings. By generating a communication based on the bot data 406, the personality of the chatbot is created in the communication making the communication unique for the inmate. After the communication is generated, the communication is transmitted (612) to the inmate. Examples of the communication include a question on a recent event at the correctional facility or a recent book that the inmate has read, based on the inmate data. Further examples include, a suggestion to contact a counselor based on the support data, in view of historical communication data. Once the communication is sent, the timer is reset (614) and the process returns to determine whether the inmate communicated (606).

When a communication is received from the inmate, the application server 208 determines a topic and an intent of the communication (616). Next, the application server 208 determines whether the communication is a question (618). If the communication is a question, the application server 208 performs a search for the answer (620). Here, the search includes a search through support data, inmate data, historical communications data, and authorized Internet webpages. The authorized Internet webpages are webpages prescreened by the correctional facility. Once an answer is found, the application server 208 generates a response based on the inmate data 404 and the bot data 406 to give personality to the response (622), and then transmits the response to the communication device 120 (624). If the inmate's communication is not a question, the application server 208 generates a response based on the determined intent and the analyzed data (622). Once a response to the inmate communication is sent, the timer is reset (614) and the process returns to determine whether the inmate communicated (606).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
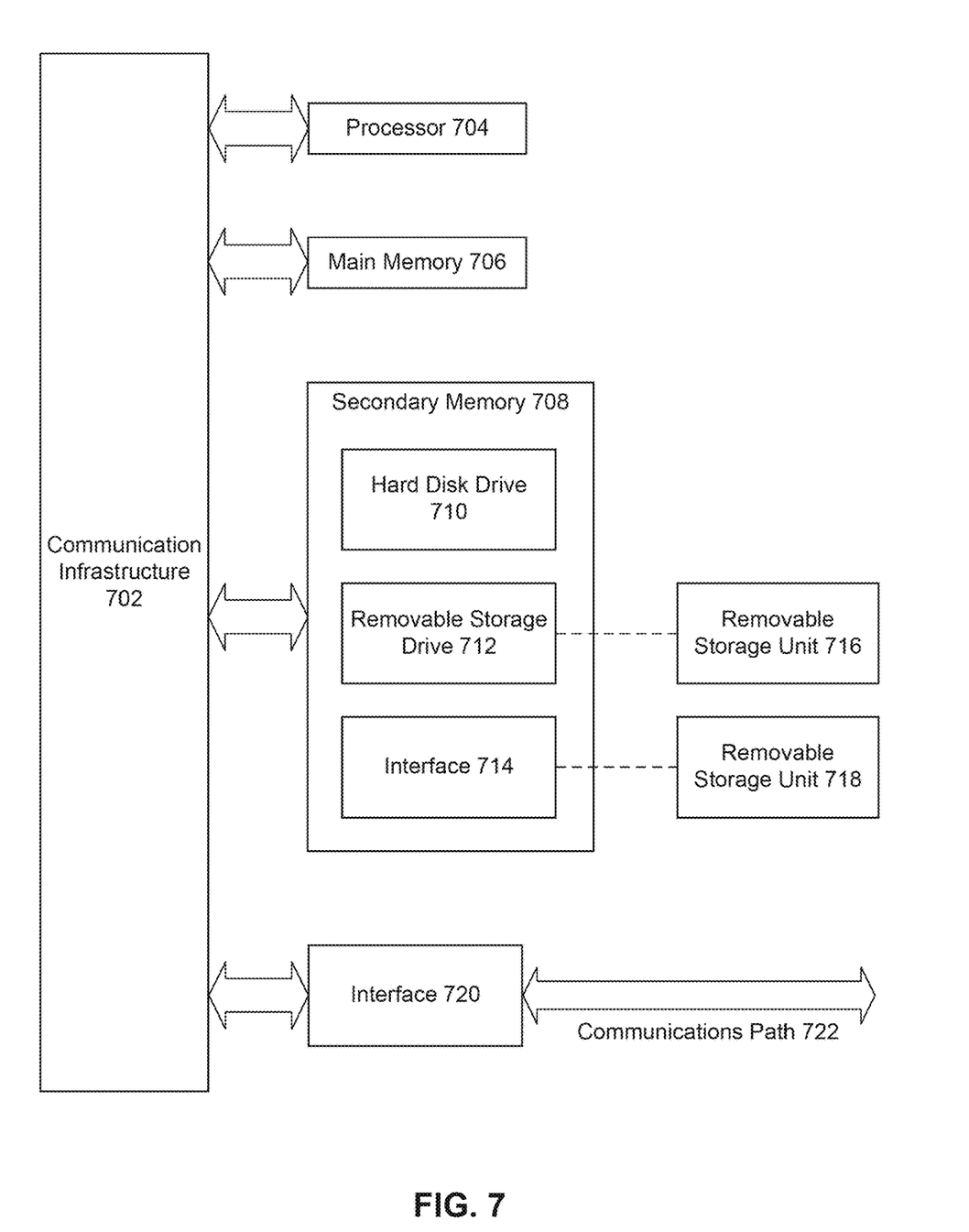
FIG. 7 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the front-end application having the user interface of FIG. 5 can be implemented in the environment of one or more computer systems or other processing systems. An example of such a computer system 700 is shown in FIG. 7.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for suspending inmate communications with a chatbot in a correctional facility, the system comprising:
   a communication device configured to facilitate an inmate in sending and receiving communications from the chatbot;
   a communication subsystem comprising a database that stores inmate data and chatbot data; and
   a monitoring center, wherein the communication device, the communication subsystem, the database, and the monitoring center are connected over a network;
   wherein the communication subsystem is configured to:
      generate a first communication of the chatbot based on analyzing the inmate data and the chatbot data wherein,
         the communication of the chatbot is configured to imitate human behavior to perceive the chatbot as a friend or family member, and wherein,
         the chatbot data includes an appearance, a voice, and a personality of the chatbot;
      transmit the first communication of the chatbot to the communication device over the network; and
      receive, from the communication device, a second communication of the inmate over the network in response to the first communication of the chatbot; and
   wherein the monitoring center is configured to:
      monitor incoming and outgoing communications between the chatbot and the communication device; and
      suspend the incoming and outgoing communications between the chatbot and the communication device based on the monitoring.

2. The system of claim 1, wherein the monitoring center is configured to suspend the incoming and outgoing communications in between the chatbot and the communication device for a predetermined period of time.

3. The system of claim 2, wherein the communication subsystem includes a timer configured to determine when to initiate a third communication of the chatbot with the inmate after the timer has reached the predetermined period of time, wherein the predetermined period of time is based on the personality of the chatbot.

4. The system of claim 1, wherein the incoming and outgoing communications include discussions of the inmate regarding organizing crime, using the chatbot improperly, or circumventing security platforms.

5. The system of claim 1, wherein the database is further configured to store communication history between the inmate and outsiders, internet searches, and data on communication logs for past communications received from the inmate.

6. The system of claim 1, wherein the communication subsystem is further configured to store the first and second communications and the incoming and outgoing communications between the chatbot and the communication device in the database.

7. The system of claim 1, wherein the communication subsystem is further configured to:
evaluate an educational level of the inmate;
analyze stored data from the data storage to determine patterns of grammar, vocabulary, and/or mathematics where the inmate can improve, wherein the patterns include repeated misspelling of words, misplacement of punctuation, or incorrect answers to mathematical questions; and
generate a communication that provides correct grammar, vocabulary, or mathematical responses to promote an increase in educational learning of the inmate.

8. A communication system for suspending inmate communications with a chatbot in a correctional facility, the communication system comprising:
a memory device that stores inmate data;
an application server configured to:
generate a first communication of the chatbot based on analyzing the inmate data and the chatbot data wherein,
the communication of the chatbot is configured to imitate human behavior to perceive the chatbot as a friend or family member, and wherein,
the chatbot data includes an appearance, a voice, and a personality of the chatbot;
transmit the first communication of the chatbot to a communication device over a network; and
receive a second communication of the inmate over the network in response to the first communication of the chatbot; and
a monitoring center configured to:
monitor incoming and outgoing communications between the chatbot and the communication device; and
suspend the incoming and outgoing communications between the chatbot and the communication device based on the monitoring.

9. The communication system of claim 8, wherein the monitoring center is configured to suspend the incoming and outgoing communications between the chatbot and the communication device for a predetermined period of time.

10. The communication system of claim 9, further comprising a timer configured to determine when to initiate a third communication of the chatbot with the inmate after the timer has reached the predetermined period of time, wherein the predetermined period of time is based on the personality of the chatbot.

11. The communication system of claim 8, wherein the incoming and outgoing communications include discussions of the inmate regarding organizing crime, using the chatbot improperly, or circumventing security platforms.

12. The communication system of claim 8, wherein the memory device further stores communication history between the inmate and outsiders, internet searches, and data on communication logs for past communications received from the inmate.

13. The communication system of claim 8, wherein the application server is further configured to store the first and second communications and the incoming and outgoing communications between the chatbot and the communication device in the memory device.

14. The communication system of claim 8, wherein the application server is further configured to:
evaluate an educational level of the inmate;
analyze stored data from the data storage to determine patterns of grammar, vocabulary, and/or mathematics where the inmate can improve, wherein the patterns include repeated misspelling of words, misplacement of punctuation, or incorrect answers to mathematical questions; and
generate a communication that provides correct grammar, vocabulary, or mathematical responses to promote an increase in educational learning of the inmate.

15. A method for suspending inmate communications with a chatbot in a correctional facility, the method comprising:
analyzing, by a communication subsystem, inmate data of an inmate;
generating, by the communication subsystem, a first communication of the chatbot based on chatbot data and the analyzed inmate data wherein,
the communication of the chatbot is configured to imitate human behavior to perceive the chatbot as a friend or family member, and wherein,
the chatbot data includes an appearance, a voice, and a personality of the chatbot;
transmitting, by the communication subsystem and over a network, the first communication of the chatbot to a communication device configured to facilitate the inmate in sending and receiving communications from the chatbot;
receiving, from the communication device and over the network, a second communication of the inmate in response to the first communication of the chatbot;
monitoring, by a monitoring center, incoming and outgoing communications between the chatbot and the communication device; and
suspending, by the monitoring center, the incoming and outgoing communications between the chatbot and the communication device based on the monitoring.

16. The method of claim 15, further comprising:
suspending, by the monitoring center, the incoming and outgoing communications between the chatbot and the communication device for a predetermined period of time, wherein the predetermined period of time is based on the personality of the chatbot.

17. The method of claim 16, further comprising:
initiating, by the communication subsystem, a third communication of the chatbot with the inmate after the predetermined period of time has elapsed.

18. The method of claim 15, wherein the incoming and outgoing communications include discussions of the inmate regarding organizing crime, using the chatbot improperly, or circumventing security platforms.

19. The method of claim 15, further comprising:
storing the first and second communications and the incoming and outgoing communications between the chatbot and the communication device in a database accessible to the communication subsystem.

20. The method of claim 15, further comprising:
evaluating an educational level of the inmate;
analyzing stored data from the data storage to determine patterns of grammar, vocabulary, and/or mathematics where the inmate can improve, wherein the patterns include repeated misspelling of words, misplacement of punctuation, or incorrect answers to mathematical questions; and
generating a communication that provides correct grammar, vocabulary, or mathematical responses to promote an increase in educational learning of the inmate.

\* \* \* \* \*